W. A. MAYHALL.
GEARING.
APPLICATION FILED DEC. 16, 1912.

1,073,055.

Patented Sept. 9, 1913.

Witnesses

William A. Mayhall
Inventor, by C. A. Snow & Co.
Attorneys.

UNITED STATES PATENT OFFICE.

WILLIAM A. MAYHALL, OF GLOSTER, MISSISSIPPI.

GEARING.

1,073,055.   Specification of Letters Patent.   Patented Sept. 9, 1913.

Application filed December 16, 1912. Serial No. 737,155.

*To all whom it may concern:*

Be it known that I, WILLIAM A. MAYHALL, a citizen of the United States, residing at Gloster, in the county of Amite and State of Mississippi, have invented a new and useful Gearing, of which the following is a specification.

My invention is an improvement in the feeding mechanism for saw mill carriages, and has for an object to provide a simplified form of gearing for actuating the saw mill carriage in a forward and reverse direction.

A further object is to provide a machine of the class described in which there will be a minimum number of parts combining a maximum amount of strength.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

Figure 1:
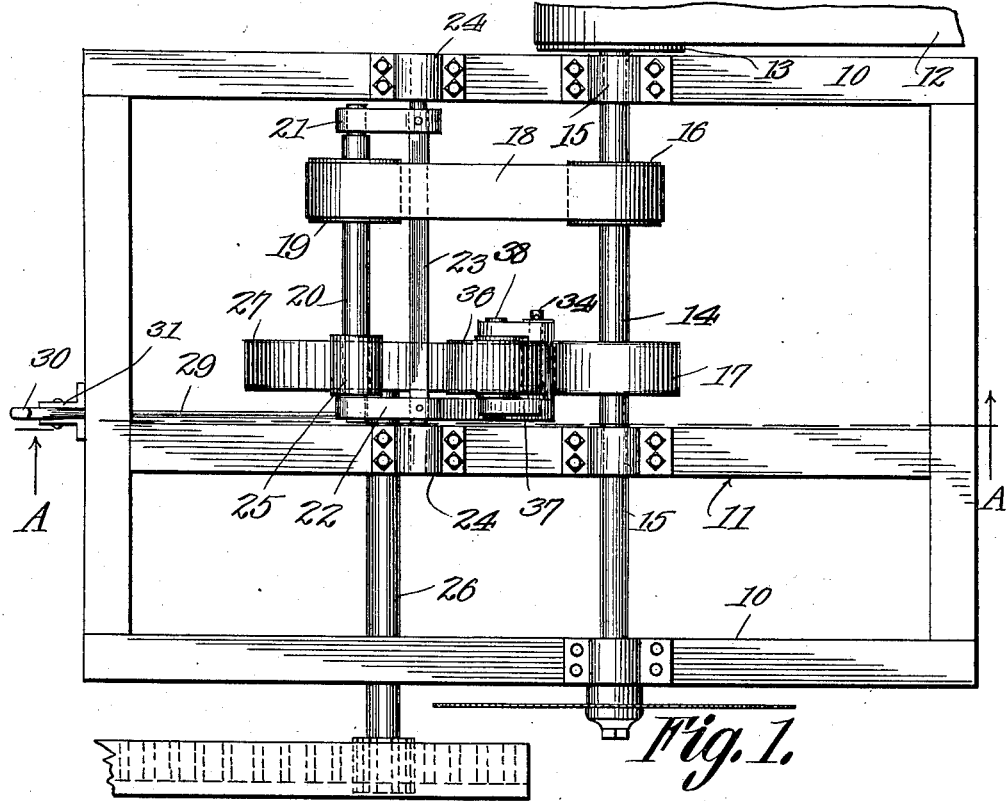
Figure 2:
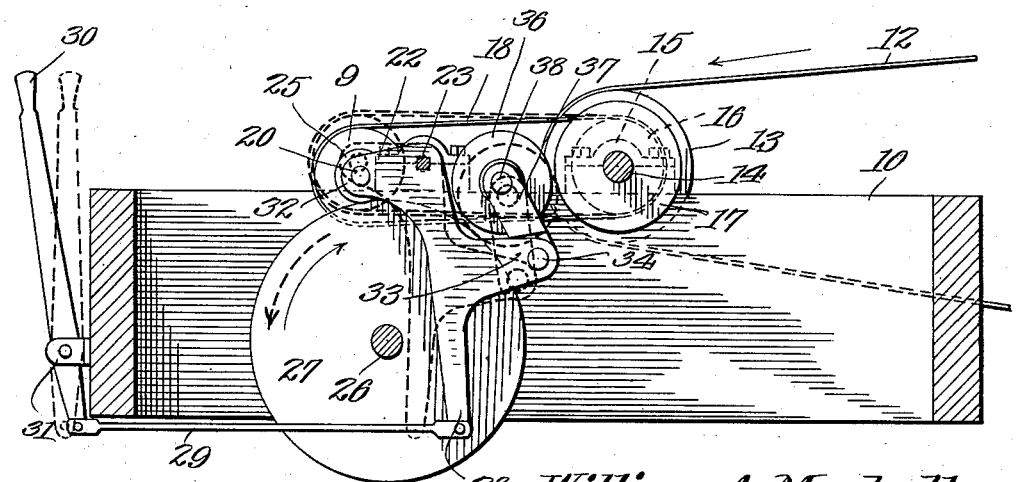

In the drawings forming a part of this specification: Figure 1 is a plan view of my improved saw mill gearing. Fig. 2 is a vertical sectional view taken on the line A—A of Fig. 1.

In the drawings 10 is a frame of suitable material designed to support the feed mechanism herein described, and is provided with a longitudinal brace 11. A driving belt 12 is shown as constituting the driving means, and actuates the pulley wheel 13, mounted upon and secured to the shaft 14 which will hereinafter be spoken of as the driving shaft. This shaft is mounted in suitable journal boxes 15—15, and has a saw mounted thereon.

A shaft 26 having a friction wheel 27 mounted thereon, by means of a rack and pinion, actuates the saw mill carriage. Motion is transmitted between this carriage actuating shaft 26 and the driving shaft 14 by means of a belt pulley 16 on the driving shaft which by means of a belt 18 drives the belt pulley 19 and mandrel 20, the said mandrel being supported in journal boxes upon the rocker arms 21 and 22. The said mandrel has a friction wheel 25 secured thereto and adapted to engage and drive the friction wheel 27 and thereby actuating the shaft 26 to drive the saw mill carriage in a forward direction.

The saw mill carriage is driven in a reverse direction by means of the friction wheel 17 mounted upon the driving shaft 14 and an intermediate friction wheel 36 mounted upon a movable carriage 37 which is pivoted to one of the aforementioned rocker arms. The intermediate friction wheel 36 actuates the friction wheel 27 and thereby the shaft 26 which shaft by means of the rack and pinion will drive the feed carriage in a reverse direction, the rocker arm 21 embodying no special feature other than, at one end it supports the mandrel 20 and at the other end is securely attached to the rocker shaft 23, upon which shaft is also mounted the rocker arm 22. This rocker arm 22, shown more clearly in Fig. 2, is supported at its upper end by and is securely attached to the rocker shaft 23, this rocker arm extending downward below the frame 10 and being connected at its lower end 28 to a rod 29 which rod is actuated by means of the lever 30 pivotally mounted upon its support 31.

The rocker arm 22 is provided near its upper end with a horizontal projection 32 which projection serves as a mounting for the mandrel 20. About half way down the rocker arm is a second projection or lug 33 having an aperture 34 near the end thereof. The frame 37 hereinbefore mentioned is pivotally connected to this projection or lug 33 and is adapted to support the friction wheel 36 running idle upon its shaft 38, the object of the friction wheel 35 having been hereinbefore mentioned.

By means of the lever 30 the rocker arm and shaft are turned and by so turning one of the friction wheels 25 and 36 is brought into engagement with and at the same time the other is thrown out of engagement with the friction wheel 27. Thus with the belt drive traveling in the direction as indicated by the arrow, and the lever and rocker arm in the position shown in Fig. 2 in full lines the friction wheel 27 will be driven in a clockwise direction and when the lever is disposed as shown in dotted lines the friction wheel 27 will be driven in a counter-clock-wise direction which motion of the friction wheel 27 will correspond with a forward and reverse movement of the saw mill carriage.

Having thus fully set out the various details of construction and pointed out the operation of the device, what I claim to be new and original with me is:—

1. In a saw mill carriage feed mechanism the combination of a driving shaft, means for supplying power to said driving shaft, rocker arms, a mandrel mounted thereupon, a belt actuated by the driving shaft and adapted to actuate said mandrel, a friction wheel mounted upon and actuated by said mandrel, a friction wheel secured to said driving shaft, a saw mill carriage operating shaft, a friction wheel secured thereto, an intermediate friction wheel adapted to engage the driving shaft friction wheel and the friction wheel secured to the carriage operating shaft, said intermediate friction wheel carried by a frame pivoted to said rocker arm, means for shifting said rocker arm to thereby bring into engagement and disengagement the intermediate friction wheel and the mandrel friction wheel.

2. In a saw mill carriage feed mechanism, the combination of a driving shaft, a carriage operating shaft, a mandrel driven by said driving shaft, a friction wheel secured to said mandrel, a friction wheel secured to said carriage operating shaft adapted to be driven by said mandrel friction wheel, a friction wheel secured to said driving shaft, an intermediate friction wheel adapted to engage said driving shaft friction wheel, and said carriage operating shaft friction wheel, a rocker shaft and arms, said mandrel supported by said rocker arms, a frame pivotally connected to one of said rocker arms and carrying said intermediate friction wheel, means for shifting said rocker arm.

3. In a saw mill feeding mechanism, a belt driven driving shaft, a friction wheel secured thereon, a carriage operating shaft, a friction wheel secured thereon, an intermediate friction wheel adapted to be lowered into engagement with said friction wheel, a mandrel, a friction wheel secured thereon, said mandrel being belt driven by said driving shaft, rocker arms supporting said mandrel, a fork frame pivotally connected to one rocker arm and supporting said friction wheel, a rocker shaft, said rocker arm connected at its upper end thereto, said rocker arm provided with a horizontal lug at the upper end thereof for supporting said mandrel, and provided with a second horizontal lug for supporting said fork frame, a rod connected to the lower end of said rocker arm and a manually operated lever connected to said rod.

In testimony that I claim the foregoing as my own, I have hereto affixed my signature in the presence of two witnesses.

WILLIAM A. MAYHALL.

Witnesses:
W. R. KENNEDY,
F. C. BROWN.

---

Copies of this patent may be obtained for five cents each, by addressing the "Commissioner of Patents, Washington, D. C."